United States Patent [19]
Fontaine et al.

[11] Patent Number: 5,286,921
[45] Date of Patent: Feb. 15, 1994

[54] UNDERSEA ELECTRIC CABLE AND AN UNDERSEA MEASUREMENT CABLE

[75] Inventors: Michel Fontaine, Haybes; Patrick Rofidal, Fumay, both of France

[73] Assignee: Filotex, Draveil, France

[21] Appl. No.: 905,818

[22] Filed: Jun. 29, 1992

[30] Foreign Application Priority Data

Jun. 28, 1991 [FR] France ............... 91 08073

[51] Int. Cl.5 .................................. H02G 15/08
[52] U.S. Cl. .................... 174/84 R; 174/68.1; 174/70 R; 174/88 C
[58] Field of Search ............ 174/84 R, 88 R, 88 C, 174/90, 68.1, 70 R, 11, 1

[56] References Cited

U.S. PATENT DOCUMENTS

| | | | |
|---|---|---|---|
| 2,742,625 | 4/1956 | Bird et al. | 439/277 |
| 3,422,212 | 1/1969 | Clark | 174/52.1 |
| 3,777,048 | 12/1973 | Trout | 174/84 R |
| 3,811,958 | 5/1974 | Maurer | 156/49 |
| 4,038,490 | 7/1977 | Miller et al. | 174/88 C |
| 4,322,573 | 3/1982 | Charlebois | 174/72 R |
| 4,528,419 | 7/1985 | Charbebois et al. | 174/88 R |
| 4,549,039 | 10/1985 | Charlebois et al. | 174/88 R |
| 4,710,593 | 12/1987 | Hall, Jr. et al. | 174/88 R |

FOREIGN PATENT DOCUMENTS

| | | |
|---|---|---|
| 354087 | 6/1922 | Fed. Rep. of Germany . |
| 1068784 | 11/1959 | Fed. Rep. of Germany .... 174/88 R |
| 1911213 | 9/1970 | Fed. Rep. of Germany .... 174/88 R |
| 1790077 | 11/1971 | Fed. Rep. of Germany .... 174/84 R |
| 1095443 | 12/1967 | United Kingdom . |
| 2000917 | 1/1979 | United Kingdom . |

Primary Examiner—Morris H. Nimmo
Attorney, Agent, or Firm—Sughrue, Mion, Zinn, Macpeak & Seas

[57] ABSTRACT

An electrical cable comprises a central conductor core protected by an intermediate sealing sheath of insulating material. The intermediate sheath is surrounded by armoring and the armoring by an outer sealing sheath of insulating material. The cable includes an electrical joint in its central core. The outer and intermediate sheaths and the armoring are cut and removed over the joint. The cable further comprises an over-molding forming a sleeve around the joint and extending over the outer sheath on either side of the joint. The armoring and the outer sheath are cut and removed over a portion of length greater than the portion over which the intermediate sheath is removed, thereby defining, on either side of the joint, a shoulder and a step between the intermediate sheath and the outer sheath. The over-molding engages snugly over the shoulders and the steps to form a watertight seal therewith.

10 Claims, 3 Drawing Sheets

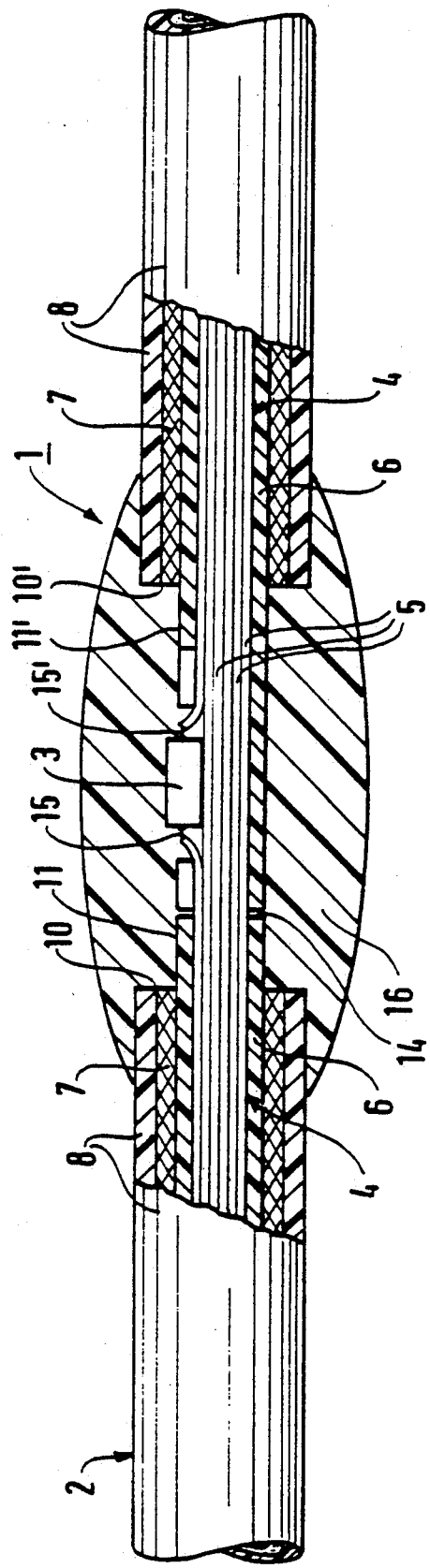
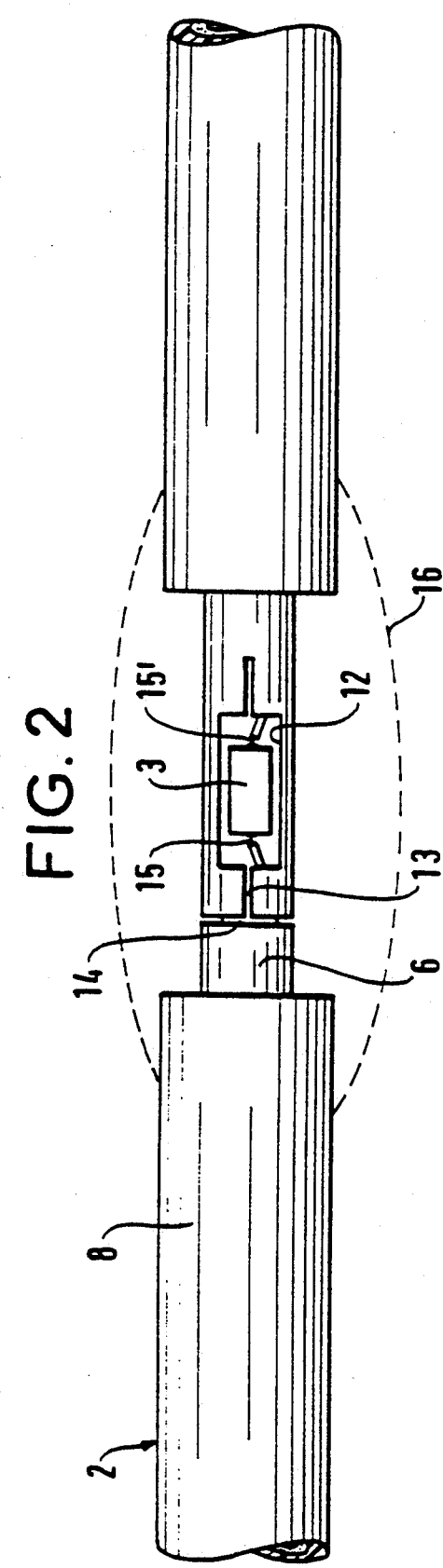

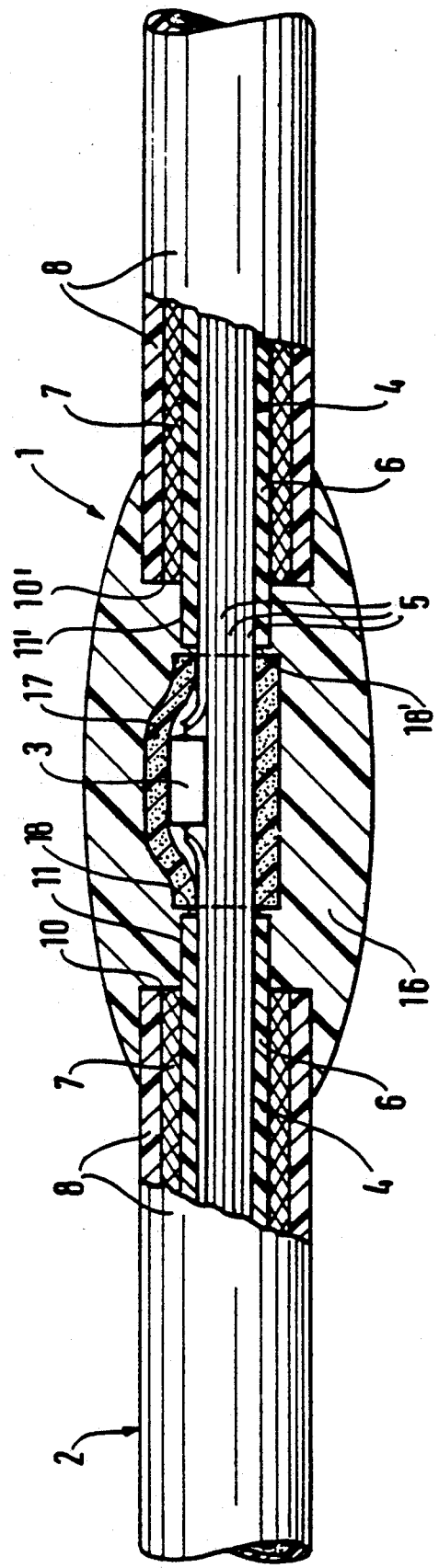

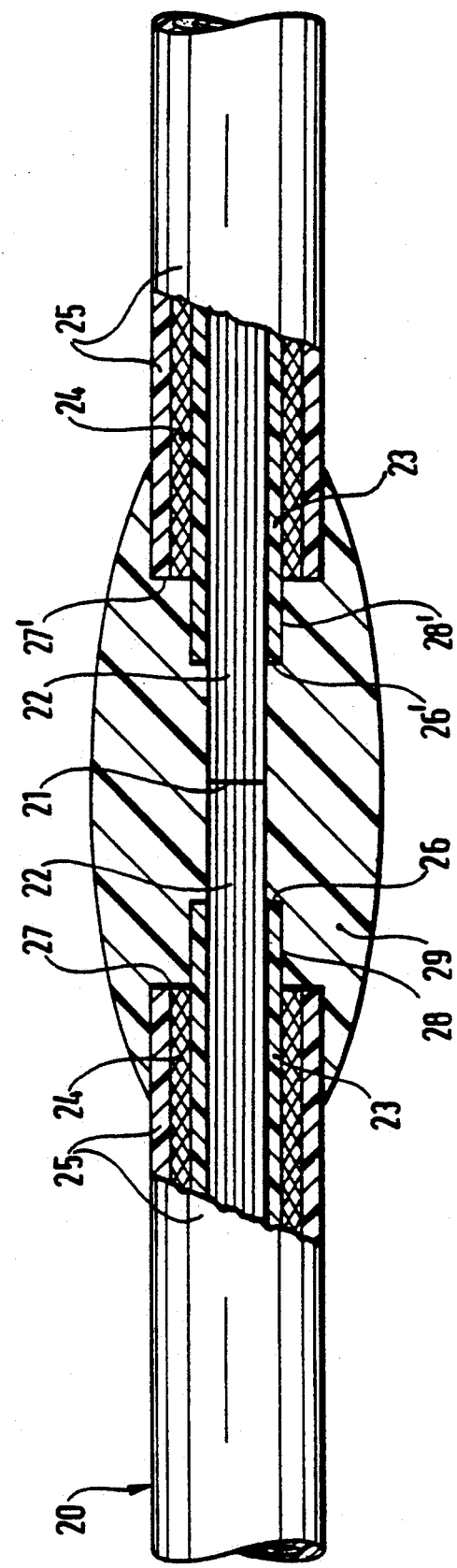

UNDERSEA ELECTRIC CABLE AND AN UNDERSEA MEASUREMENT CABLE

The present invention relates to an undersea electric cable and an undersea measurement cable.

BACKGROUND OF THE INVENTION

Undersea measurement cables are used in particular for measuring temperature or pressure, e.g. at different depths under water. In general, they are carried and towed by boats or submarines. Reference is made more particularly below to a particular measurement cable called a "bathythermal" cable, but this example is not limiting.

A bathythermal cable is fitted with thermistors and is intended to measure temperature in a liquid medium, and more particularly the sea, and at depths which, at present, may be as much as about 120 meters (m).

At the surface, a bathythermal cable includes a drifting buoy connecting a main cable having a plurality of thermistors mounted thereon to an electrical device for receiving and processing information provided by the thermistors. The cable may have up to 10 thermistors. More precisely, the main cable comprises a central core constituted by a plurality of conductors and covered by a first sealing insulating sheath referred to as the "intermediate" sheath. Armoring is disposed around the intermediate sheath, e.g. in the form of steel braid or strip, serving to protect the intermediate sheath against possible puncturing and to provide the mechanical strength of the cable, said armoring being itself protected by a second sealing insulating sheath referred to as the "outer" sheath. Each of the thermistors is electrically connected to the main cable. To do this, the central core of the main cable is stripped over a portion of cable of appropriate length for making the connection. To perform this operation, all three layers of protection (outer sheath, armoring, intermediate sheath) are cut on either side of the portion to be stripped, such that the ends of the three layers of protection lie in common sections on either side thereof. All three layers of protection cut in this way are then removed over the portion to be stripped. Thereafter, one of the conductors of the core is cut in order to be bonded to the terminals of the thermistor to be connected. Each thermistor is connected in this way to a separate conductor of the central core. Sealing is provided at the connection between a thermistor and the main cable by means of locally over-molding insulating material that constitutes a sleeve extending around the thermistor and over the ends of the outer sheaths on either side of the thermistor.

The end of the bathythermal cable opposite to its end connected to the buoy has a pressure sensor. The cable may also possibly include a strength member which is disposed eccentrically or which is centered relative to the main cable (in which case the conductors of the central core are disposed around the strength member).

It is clear that like any electrical measuring apparatus that is immersed in a liquid, a bathythermal cable must be perfectly liquid-tight both at its ends and longitudinally, and above all where the over-molding is performed.

Unfortunately, in particular when used in hot seas, the outer sheath and the over-molding run the risk of being torn, e.g. by shark bites. Under other conditions, the sealing of the bathythermal cable may be broken by catching on sharp rocks or on boat anchors, in particular.

Thus, when the outer sheath is punctured, water infiltrates into the armoring, runs along the armoring since it is difficult to achieve perfect contact between the metal of the armoring and the insulating material of the outer sheath, and then reaches the thermistors by running along the connections between the over-molding and the protective sheaths. This leads to the electrical system being degraded, in particular by giving rise to short circuits, thus making measurement impossible.

Similar problems are observed at joints between two cables such as the main cable described above. The method of connecting one such cable to another is similar to that of connecting the above main cable to an electronic component: all three layers of protection are cut and removed from the ends of the cables to be connected together such that the ends of all three protective layers lie in the same section, then the cores are connected together, after which over-molding re-establishes sealing over the assembly. Here again, as in a measurement cable, given that sealing is not guaranteed in the contact zone between the metal armoring and the insulating outer sheath, water can flow therebetween until it reaches the interface between the over-molding and the end section of the three layers of protection, after which it can reach the central core and degrade the electrical connections.

The object of the present invention is thus to provide an undersea electric cable and an undersea measurement cable capable of preventing water from penetrating to their conductive cores.

SUMMARY OF THE INVENTION

To this end, the present invention provides an electric cable comprising a central conductor core protected by an intermediate sealing sheath of insulating material, itself surrounded by armoring and then by an outer sealing sheath of insulating material, said cable including an electrical joint in its central core, said outer and intermediate sheaths and said armoring being cut and removed over said joint, and the cable further comprising over-molding forming a sleeve around said joint and extending over said outer sheath on either side of said joint.

wherein said armoring and said outer sheath are cut and removed over a portion of length greater than the portion over which said intermediate sheath is removed, thereby defining, on either side of said joint, a shoulder and a step between said intermediate sheath and said outer sheath, said over-molding engaging snugly over said shoulders and said steps.

The present invention also proposes a measurement cable comprising:

a central conductor core protected by an intermediate sealing sheath of insulating material, itself surrounded by armoring and then by an outer sealing sheath of insulating material;

an electronic component connected to said core, said intermediate sheath and said outer sheath and said armoring being cut and removed on either side of said component; and over-molding forming a sleeve around said component and extending over the outer sheath on either side of said component;

wherein said armoring and said outer sheath are cut and removed over a length greater than the length over which said intermediate sheath is removed, thereby defining on either side of said component, a shoulder and a step between said intermediate sheath and said outer sheath, said over-molding engaging snugly over said shoulders and said steps.

Advantageously, said intermediate sheath may be cut so as to define a shoulder between said central core and said intermediate sheath.

Said armoring is selected from a metal braid and a metal strip.

Preferably, said intermediate sheath, said outer sheath, and said over-molding are made of the same insulating material.

Since the electronic component in a measurement cable is connected to the corresponding conductor by means of connection terminals, a tape of insulating material is taped around said component and said terminals prior to said over-molding being performed.

Finally, said intermediate sheath may also have a through window coinciding with said component.

BRIEF DESCRIPTION OF THE DRAWINGS

Embodiments of the invention are described by way of example with reference to the accompanying drawings, in which:

FIG. 1 is a partially cutaway longitudinal section through a length of a measurement cable of the invention;

FIG. 2 is a plan view of FIG. 1 in which the over-molding is represented by dashed lines for greater clarity;

FIG. 3 is a longitudinal section view through a length of another measurement cable of the invention; and FIG. 4 is a partially cutaway longitudinal section through an undersea cable of the invention.

DETAILED DESCRIPTION

In FIGS. 1 and 2, a length 1 of bathythermal cable comprises a length of main cable 2 having bonded thereto a thermistor 3 which is represented by a rectangle. The length of cable 2 comprises a central conductive core 4 made up of a plurality of insulated conductors 5 having a first sealing sheath 6 excluded thereabout and referred to as the "intermediate" sheath, which sheath is made of an insulating material such as polyvinyl chloride (PVC) or polyurethane, for example. Armoring constituted by a metal braid 7 made of steel is placed around the intermediate sheath 6 for the purposes of protecting the intermediate sheath 6 and of providing the mechanical strength of the cable. Finally, a second sealing sheath 8 referred to as the "outer" sheath, likewise made of an insulating material such as PVC or polyurethane, is extruded around the braid 7. In order to connect the thermistor 3 to the cable 2, the braid 7 and the outer sheath 8 are initially cut and removed over a portion of length sufficient to enable the connection to be made and so as to create shoulders 10 and 10' on either side of said portion, followed by steps 11 and 11' separating the intermediate sheath 6 from the outer sheath 8. Thereafter a rectangular through window 12 is formed in a central zone of the intermediate sheath 6 which has been stripped in this way. The size of the window 12 is slightly greater than the size of the thermistor 3. Thereafter the intermediate sheath 6 is cut on either side along a generator line extending the window 12 so as to create a slot 13 (see FIG. 2). In order to strip the central core 4, a circular cut 14 is made at one of the ends of the slot 13. One of the conductors 5 of the core 4 is then cut and bonded to the terminals 15 and 15' of the thermistor 3.

The intermediate sheath 6 is then put back into place over the thermistor 3 and in such a manner that the through window 12 coincides therewith.

Sealing is provided at the thermistor 3 by means of an over-molding 16 of an insulating material similar to that used for the intermediate and outer sheaths, and in the form of a sleeve whose inside surface engages the thermistor 3 and the intermediate sheath 6 and spills over onto the outer sheath 8 on either side of the thermistor 3. It bonds securely to the outer sheath 8 and it fits snugly over the shoulders 10 and 10' and the steps 11 and 11'.

The "set-back" situation of the braid 7 and of the outer sheath 8 thus provides an additional step 11, 11' as compared with the structure of the prior art. This additional step 11, 11' constitutes an obstacle to water penetrating as far as the thermistor 3. Thus, when the outer sheath is punctured, water seeps between the steel braid 7 and the outer sheath 8 and is stopped at the horizontal barrier formed by the step 11, 11'. Whereas there is only one step in over-molding on prior art cables, over-molding of cables of the present invention has two steps, i.e. the contact area and the sealing barrier are greater.

Having two horizontal contact areas between the sealing sheaths and the over-molding provides the measurement cable of the invention with increased protection against penetration of the water or liquid in which it is immersed, and therefore enables it to operate more effectively.

The structure described above with reference to FIG. 1 corresponds in general to using thermistors or other electronic components that are of small size (about 4 mm in diameter and about 10 mm long).

When the electronic components are larger in size (about 10 mm in diameter and a few centimeters long), the general structure is as shown by the length 1 in FIG. 3. In this figure, items that are common with items in FIGS. 1 and 2 are given the same reference numerals.

In this case, in order to insert a thermistor 3, the braid 7 and the outer sheath 8 are cut and removed over a portion of sufficient length to perform the connection, and the intermediate sheath 6 is cut and removed over a shorter length so as to leave on either side of the connection portion: shoulders 10 and 10', followed by steps 11 and 11' separating the intermediate sheath 6 and the outer sheath 8, and also shoulders 18 and 18' between the intermediate sheath 6 and the central core 4.

One of the conductors 5 of the core 4 is then cut and bonded to the terminals 15 and 15' of the thermistor 3. In order to prevent the terminals 15 and 15' subsequently becoming embedded in the over-molding 16 which is applied over the thermistor 3 to extend over the outer sheath 8 on either side thereof, as in the structure of FIG. 1, a tape 17 of butyl rubber, for example, is taped around the thermistor 3 and its terminals 15 and 15'. Over-molding 16 is then formed thereover.

Such a disposition reduces the stresses that may appear when the bathythermal cable is folded at the terminals 15 and 15', since in the event of the terminals adhering securely to the over-molding 16, that could give rise to breakage thereof.

The measurement cable made in this way has the same properties and advantages as the cable of which a length is shown in FIGS. 1 and 2.

Naturally, the measurement cable of the invention may comprise one or more lengths similar to those described above, and thermistors may be replaced by any other electronic measurement component, e.g. pressure sensors.

FIG. 4 shows an undersea electric cable 20 having a joint 21 in its multi-conductor central core 22. The joint 21 is made, for example, by bonding together the conductors of the central core 22 end to end, or by crimping. The cable 20 also includes an intermediate sheath 23 made of insulating material, armoring 24 in the form of a metal braid, and an outer sheath 25 made of insulating material.

The intermediate sheath 23 of the cable 20 is cut and removed from either side of the joint 21 so as to define shoulders 26 and 26' between the central core 22 and the intermediate sheath 23. In addition, the armoring 24 and the outer sheath 25 are cut and removed over a portion of length greater than that of the portion over which the intermediate sheath 23 is removed, thereby defining shoulders 27 and 27' and steps 28 and 28' between the intermediate sheath 23 and the outer sheath 25 on either side of the joint 21.

Sealing at the joint 21 is provided by an over-molding 29 of insulating material preferably similar to that used for the sheaths 23 and 25, and in the form of a sheath whose inside surface engages over the joint 21 and the intermediate sheath 23 and overlaps onto the outer sheath 25 on either side of the joint 21.

The undersea cable 20 has the same properties and the same advantages as the cables described with reference to FIGS. 1 to 3.

The electric cable or the measurement cable of the invention may also include a strength member, e.g. made of steel, serving to provide mechanical reinforcement. The strength member may be centered on the central core or it may be eccentric, i.e. at the periphery of the main cable. When it is centered, the conductors of the central core are disposed around the strength member. A connection is also made in the central strength member at the join 21 in the cable shown in FIG. 4.

In addition, the measurement cable of the invention may be electrically connected at its end which is closer to the surface to a device for receiving and processing the information provided by the electronic components, and at its other end it may be connected to a pressure sensor for the purpose of verifying that said other end, and consequently all of the components, are indeed immersed to a desired depth.

The central cores of cables of the invention may be single-conductor or multi-conductor, depending on the application.

Finally, any means may be replaced by equivalent means without thereby going beyond the ambit of the invention.

We claim:

1. In an underwater electric cable comprising a central conductor core protected by an intermediate sealing sheath of insulating material, armoring surrounding said intermediate sheath, an outer sealing sheath of insulating material surrounding said armoring, said cable including an electrical joint in said central conductor core, said outer and intermediate sheaths and said armoring being cut and removed over said joint, and the cable further comprising an over-molding forming a sleeve around said joint and extending over said outer sheath on either side of said joint; the improvement wherein said armoring and said outer sheath are cut and removed over a portion of length greater than the portion over which said intermediate sheath is removed, and thereby defining, on either side of said joint, a shoulder and step between said intermediate sheath and said outer sheath, sand said over-molding engaging snugly over said shoulders and said steps and forming a watertight seal therewith.

2. In an undersea measurement cable comprising:
a central conductor core protected by an intermediate sealing sheath of insulating material, an armoring surrounding said intermediate sealing sheath, and and outer sealing sheath of insulating material surrounding said armoring;
an electronic component connected to said core, said intermediate sheath and said outer sheath and said armoring being cut and removed on either side of said component; and
an over-molding forming a sleeve around said component and extending over the outer sheath on either side of said component; the improvement wherein said armoring and said outer sheath are cut and removed over a length greater than a length over which said intermediate sheath is removed, thereby defining on either side of said component, a shoulder and a step between said intermediate sheath and said outer sheath, and said over-molding engaging snugly over said shoulders and said steps and forming a watertight seal therewith.

3. A cable according to claim 1, wherein said intermediate sheath is cut so as to define a shoulder between said central core and said intermediate sheath.

4. A cable according to claim 1, wherein said armoring is one material selected from the group consisting of a metal braid and a metal strip.

5. A cable according to claim 1, wherein said intermediate sheath, said outer sheath, and said over-molding are made of the same insulating material.

6. A cable according to claim 2, wherein said intermediate sheath is cut so as to define a shoulder between said central core and said intermediate sheath.

7. A cable according to claim 2, wherein said armoring is one material selected from the group consisting of a metal braid and a metal strip.

8. A cable according to claim 2, wherein said intermediate sheath, said outer sheath, and said over-molding are made of the same insulating material.

9. A cable according to claim 2, wherein a tape of insulating material is taped around said component and said terminals prior to said over-molding being performed.

10. A cable according to claim 2, wherein said intermediate sheath has a through window coinciding with said component and reducing the same.

* * * * *